United States Patent [19]
Aldinger et al.

[11] Patent Number: 6,110,854
[45] Date of Patent: *Aug. 29, 2000

[54] LIQUID-PHASE SINTERING PROCESS FOR ALUMINATE CERAMICS

[75] Inventors: Fritz Aldinger, Leinfelden-Echterdingen; Günter Schäfer, Stuttgart; Andreas Hachtel, Leinfelden-Echterdingen, all of Germany

[73] Assignee: Max-Planck-Gesellschaft zur Forderung de Wissenschaften, e.V., Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/864,560

[22] Filed: May 28, 1997

[30] Foreign Application Priority Data

May 28, 1996 [DE] Germany .................. 196 21 413

[51] Int. Cl.[7] ........................................... C04B 35/18
[52] U.S. Cl. ..................................... 501/127; 501/153
[58] Field of Search .................................. 501/127, 153

[56] References Cited

U.S. PATENT DOCUMENTS 3,404,036 10/1968 Kummer et al. .
4,233,078 11/1980 Brown ..................................... 501/127
4,595,665 6/1986 Takayama et al. ..................... 501/127
4,804,646 2/1989 Ray ........................................ 501/127
5,190,899 3/1993 Sutor ..................................... 501/127

FOREIGN PATENT DOCUMENTS 66746 12/1982 European Pat. Off. .
403126660 5/1991 Japan .
403174354 7/1991 Japan .
403215366 9/1991 Japan .
404275984 10/1992 Japan .

OTHER PUBLICATIONS

"Dielectric Properties of Li Aluminates for Ceramic Breeder Materials" El Fattah et al Mater Charact (1993), 30(2), 127–135.

"Boran Containing Ceramic Particulates & Whisker Enhancmt of the Fracture Toughness of Ceramic Matrix Composites" Lin et al AIP Conf. Proc (1991).

*Primary Examiner*—Paul Marcantoni
*Attorney, Agent, or Firm*—Fulbright & Jaworski, LLP

[57] ABSTRACT

Use of a boron-containing sinter additive when synthesizing aluminum-oxide ceramics makes it possible to carry out the sintering process at temperatures below 1500° C., which means that ion-conducting aluminum-oxide ceramics can be obtained.

27 Claims, 7 Drawing Sheets

BAYERIT COATED

COARSE BÖHMIT COATED

LIQUID-PHASE SINTERING PROCESS FOR ALUMINATE CERAMICS

SPECIFICATION

This invention relates to the use of a boron-containing sinter additive for the synthesis of aluminum oxide ceramics, a process for the production of an aluminum oxide ceramic formed piece, and a boron-containing aluminum oxide ceramic formed piece.

β-aluminates are two-dimensional layered structures made up of aluminum oxide spinel blocks with alkali-metal oxide layers disposed regularly therebetween. The high concentration of defects in the alkali-metal oxide layers is the reason for the very good mobility of the alkali-metal ions. A distinction is made between two structures which are ion-conducting to different degrees. The structure which is more highly ion-conducting is referred to as the β" phase. This structure contains a higher proportion of alkali-metal oxide than does the β phase.

The β"-phase elementary cell consists of three $\gamma$-$Al_2O_3$ spinel blocks with the $Na_2O$ layers disposed therebetween. The levels of conductivity can be referred to here as the defect structure of the aluminum oxide layers (cf. G. C. Farrington, B. Dunn, Solid State Ionics 7 (1982), 267; F. Harbach, J.Mat.Sci. 18 (1983), 2437; R. Collongues et al., J.Phys.Chem. Solids 45 (1984), 981).

The β-phase elementary cell consists of two $\gamma$-$Al_2O_3$ spinel blocks. In this case there is a crystallographic symmetry plane in the conductivity level (cf. R. Collongues et al. as above).

On account of its high ion conductivity, especially sodium ion conductivity, the β"-phase is suitable as a solid electrolyte for batteries and fuel cells (cf. R. Knoedler and R. Krapf, J. Power Source 10 (1983), 263–270; Zebra Zelle, J. Coetzer et al., J. Electrochem. Soc. 134 (1987), 2379).

For fuel cells, proton-conducting ceramics are of particular interest. However, nobody has so far succeeded in synthesizing such materials. The only method possible is by way of ion exchange with a suitable starting material. Due to the very similar elementary cells of K-β"-aluminate and H-β"-aluminate, K-β"-aluminate is a potential starting material. The exchange of sodium ions in Na-β"-aluminate or potassium ions in K-β"-aluminate with other ions, e.g. $Li^+$, $K^+$, $Rb^+$, $H_3O^+$, $NH_4^+$, $Ca^{2+}$, $Sr^{2+}$, $Ba^{2+}$, $Cd^{2+}$ and $Pb^{2+}$ is also of great interest, as this provides a means of synthesizing solid-state ionic conductors with interesting properties and a large number of potential technical applications. The prerequisite for this synthetic approach, however, is a dense Na-β"-aluminum oxide or K-β"-aluminum oxide ceramic which is strong enough to withstand the stresses induced during ion exchange. Because of their two-dimensional structure the β"- and β-aluminates, however, are characterized by a strongly anisotropic grain growth. At elevated temperatures (>1500° C.) the grains also become much more coarse. Another problem is the loss of alkali metal oxide at elevated temperatures. As a consequence of these processes the material has poor compacting properties, and solid-phase-sintered samples exhibit a high degree of porosity. As such they are not suitable for use as an electrolyte.

In the DE-41 22 586 C1 a process for the production of K- or Rb-β"-aluminum oxide ceramic formed pieces to be used as ion conductors is described. The process involves a sintering step performed at a temperature in the range from 1500° C. to 1700° C., and β"-aluminum oxide ceramics are obtained. A disadvantage of this process, however, is the poor reproducibility.

The object of the present invention is thus an improved method of synthesizing aluminum oxide ceramics which are particularly suitable for use as ion conductors.

This object is established according to the invention by making use of a boron-containing sinter additive for the synthesis of aluminum oxide ceramics. Surprisingly, through use of a boron-containing sinter additive, a liquid phase is obtained already at temperatures around 1000° C., which means that a liquid-phase sintering process is possible at a relatively low temperature. In the process described in the DE-41 22 586, by contrast, the molten phase is not obtained until a temperature above 1500° C. has been reached, i.e. at a considerably higher temperature.

The boron-containing sinter additive does not generally dissolve to any substantial extent in the $Al_2O_3$ phase during the sintering process, and on cooling forms a separate glass phase which is contained in pores of the ceramic matrix and does not impair the structure of the latter.

All boron-containing compounds are suitable as sinter additives according to the invention. Use is made preferably of compounds based on boron oxide, for example $B_2O_3$ or borates, in order to form a molten phase with aluminum oxide. According to a preferred embodiment the sinter additive contains, in addition to the boron oxide or borate, one or more alkali metal oxides such as $Li_2O$, $Na_2O$, $K_2O$, $Rb_2O$ and/or $C_2O$. It is furthermore preferable if, instead of or in addition to the alkali metal oxide, the sinter additive may contain one or more metal oxides of other metals. Examples of suitable metal oxides are MgO, ZnO, NiO, MnO, $FeO_x$, $CrO_x$, CoO and $SnO_x$. According to a particularly preferred embodiment the sinter additive contains one or more metal oxides selected from the group comprising $K_2O$, $Li_2O$, $Na_2O$ and MgO. For example, the addition of $Li_2O$ leads to the composition Li—B—Al—O, and of $K_2O$ to the composition K—Li—B—Al—O.

As sinter additive use can also be made of a mixed metal-boron oxide. Suitable sinter additives are, for example, $KBO_2$, $K_2B_2O_4$, $K_2B_4O_7$, $Mg_2B_2O_5$, $NaBO_2$, $Na_2B_2O_4$, $Na_2B_4O_7$, $MgB_4O_7$, $LiBO_2$, $Li_2B_2O_4$, $Li_2B_4O_7$ and $Mg_3B_2O_6$ as well as combinations of these compounds. Instead of Mg or Li, use can also be made of the aforementioned metals, namely Zn, Ni, Mn, Fe, Cr, Co and Sn in mixed metal-boron oxides. Particular preference is given to $Na_2B_4O_7$ as sinter additive. Use according to the invention of the boron-containing sinter additives provides a relatively simple means of synthesizing—in particular—β-aluminum oxide ceramics and—especially preferred—β"-aluminum oxide ceramics of high quality and good reproducibility.

A further object of the invention is a process for the production of an aluminum oxide ceramic formed piece, preferably a β-aluminum oxide ceramic formed piece and even more preferably a β"-aluminum oxide ceramic formed piece, in which process powdered aluminum oxide is transformed into a ceramic formed piece by way of sintering with addition of a boron-containing sinter additive. Use is made preferably of bayerite and boehmite as powdered aluminum-oxide raw material. The aluminum oxide in this case preferably has an average grain size of <1 μm.

The sintering process can, on the one hand, be carried out using a two-phase powder mixture, in which case a metal oxide, for example an alkali-metal oxide, and aluminum oxide are premixed or prereacted as one phase and aluminum oxide and another metal oxide, for example a magnesium oxide, are premixed or prereacted as the second phase. Premixing can be performed in any way desired, e.g. by grinding $Al_2O_3$ powder and metal oxide powder in a ball mill containing, e.g., milling balls and corundum, with addition of an alcoholic medium and subsequent drying. Premixing can also be carried out on an industrial scale in a grinding mill by preparing an aqueous slurry which is subsequently subjected to spray drying. On the other hand, use can also be made of prereacted metal oxide/aluminum oxide powder, e.g. with alkali metal oxide—and/or MgO—doped $Al_2O_3$ powder. In this way two aluminum oxide phases are obtained which can have different melting points, so that after mixing of both phases with the sinter additive, the phase with the lower melting point, together with the sinter additive, generates a localized high proportion of liquid phase on sintering (see FIG. 1a).

It is preferable, however, to use a homogeneous aluminum oxide phase or metal oxide/aluminum oxide phase in which the sinter additive is distributed homogeneously. To this end the aluminum oxide powder or metal oxide powder/aluminum oxide powder is mixed homogeneously with the sinter additive prior to sintering. The use of homogeneous aluminum oxide phases has a beneficial influence on compaction during the sintering process.

According to a particularly preferred embodiment the aluminum oxide powder or metal oxide/aluminum oxide powder is coated with the boron-containing sinter additive. Coating can be carried out, e.g., by adding the sinter additive in the form of a dissolved salt—e.g. as a concentrated aqueous solution—to the ceramic-powder particles, which can be suspended in an alcoholic and/or aqueous medium. When the resulting mixture is dried, the ceramic-powder particles are coated homogeneously with a thin layer of sinter additive. Ceramic particles coated in this way (see FIG. 1b) are the most suitable form of starting material for the process according to the invention.

The sintering process can also be improved by selection of a suitable sintering atmosphere. Preference is given to a moisture-free sintering atmosphere such as a dry air or oxygen atmosphere with an alkali metal oxide vapor pressure of at least 1 Pa, preferably at least 100 Pa and even more preferably at least 1000 Pa. The alkali metal oxide vapor pressure serves to prevent the decomposition reaction of the β" phase and resulting coarsening of the material. In addition, an alkali metal oxide vapor pressure in the sintering atmosphere prevents evaporation losses and thus decomposition losses in the ceramic to be sintered. The alkali metal oxide vapor pressure in the sintering atmosphere is preferably adjusted by addition of alkali metal oxide borates such as sodium borate and/or potassium borate as sinter additive. The proportion by weight of alkali metal borate to the rest of the borate is preferably between 10:1 and 1:10.

The process according to the invention is preferably carried out at a temperature of 1000° C. to 1500° C., even more preferably at a temperature of 1250° C. to 1400° C. Dense ceramics are obtained even at these temperatures. If sintering temperatures of >1300° C. are used, the sintering process can be controlled in certain embodiments of the invention such that at least some of the boron-containing sinter additive evaporates. In this way the proportion of additive phase in the ceramic matrix is reduced.

The boron-containing sinter additive is preferably used in a quantity of 0.1–12 wt. %, more preferably 2–10 wt. % and most preferably 3–6 wt. %, calculated as $B_2O_3$ and relative to the total weight of the sinter mixture. If less than 0.1 wt. % of sinter additive is used, the process can no longer be carried out in a reproducible manner.

A further object of this invention are aluminum oxide ceramic formed pieces obtainable by means of the process described above. When carrying out the sintering process at a temperature, where the boron-containing sinter additive does not evaporate significantly, these formed pieces contain 0.1 wt. % to 12 wt. % of boron, preferably 2 wt. % to 10 wt. % and even more preferably 3 wt. % to 6 wt. %, calculated as $B_2O_3$ and relative to the total weight of the ceramic. It is preferable if the ceramic is a β-aluminum oxide ceramic and even more preferable if it is a β"-aluminum oxide ceramic. The boron is preferably present in the form of an oxidic glass phase which penetrates into the pores of the ceramic matrix. However, when carrying out the sintering process at a temperature, where the boron-containing sinter additive substantially evaporates, the formed pieces contain boron in an amount from the lower detection limit up to 1 wt. %, preferably from 0.00001 wt. % to 0.1 wt. %.

According to the invention, ceramics can be synthesized which contain, besides boron, aluminum and oxygen, any metal ions desired. The aluminum oxide ceramics of the invention preferably contain, besides boron, Li, Na, K, Rb, Cs, Mg, Zn, Ni, Mn, Fe, Cr, Co and/or Sn. According to a particularly preferred embodiment, the aluminum oxide ceramics of the invention comprise a K—Li—B—Al—O, a K—Mg—B—Al—O— and/or a K—Li—Mg—B—Al—O phase. Such phases are excellent potassium ion conductors. In a likewise preferred embodiment the aluminum oxide ceramics comprise a Na—Li—B—Al—O, a Na—Mg—B—Al—O and/or a Na—Li—Mg—B—Al—O phase. Solid phases of this type are excellent sodium ion conductors. In these ceramics the amount of the B component may be substantially reduced dependent on the sintering temperature, optionally even to the lower detection limit.

For a combination of Na- and K-ion conduction it is also possible to make aluminum oxide ceramics with a K—Na—Li—B—Al—O, a K—Na—Mg—B—Al—O and/or a K—Na—Li—Mg—B—Al—O phase. In these ceramics too, the amount of the B component may be substantially reduced.

In order to obtain defined additional conductivities when synthesizing mixed oxidic conductors additional components can be added such as ZnO, NiO, MnO, $FeO_x$, $CrO_x$, CoO and SnO. These metal oxides are preferably used in place of $Li_2O$ and/or MgO.

Another object of the invention is the use of a ceramic formed piece according to the invention as ion conductor. The ceramic formed pieces of the invention are particularly suitable, depending on their composition, as potassium- and/or sodium-ion conductors.

The invention is explained in more detail by means of the following examples and the enclosed drawings.

EXAMPLES

Example 1

Production of Ceramic Formed Pieces and Determination of Their Relative Densities Homogeneously coated mixtures of bayerite with a BET surface area of 28.3 $m^2/g$ and the sinter additive $Na_2B_4O_7$ or $NaBO_2$, of fine-grained boehmite with a BET surface area of 8.5 $m^2/g$ and the sinter additive $Na_2B_4O_7$ or $NaBO_2$ and of coarse-grained Böhmit with a BET surface area of 10.8 $m^2/g$ and the sinter additive $Na_2B_4O_7$ or $NaBO_2$ were prepared. This was done by means of dropwise addition of the borate salts in the form of a concentrated aqueous solution to the ceramic particles suspended in an alcoholic medium, with continuous stirring. On conclusion of the dropwise addition the resulting mixture was dried.

Figure 1A:
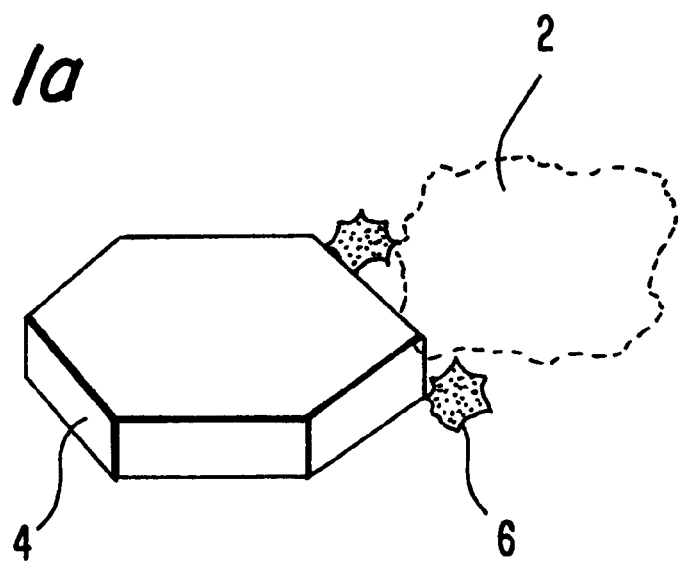
FIG. 1a depicts schematically a mixture of two different, prereacted metal oxide/aluminum oxide powders, namely prereacted $K_2O$ and $Al_2O_3$ (2) and prereacted MgO and $Al_2O_3$ (4), along with the sinter additive (6)
Figure 1B:
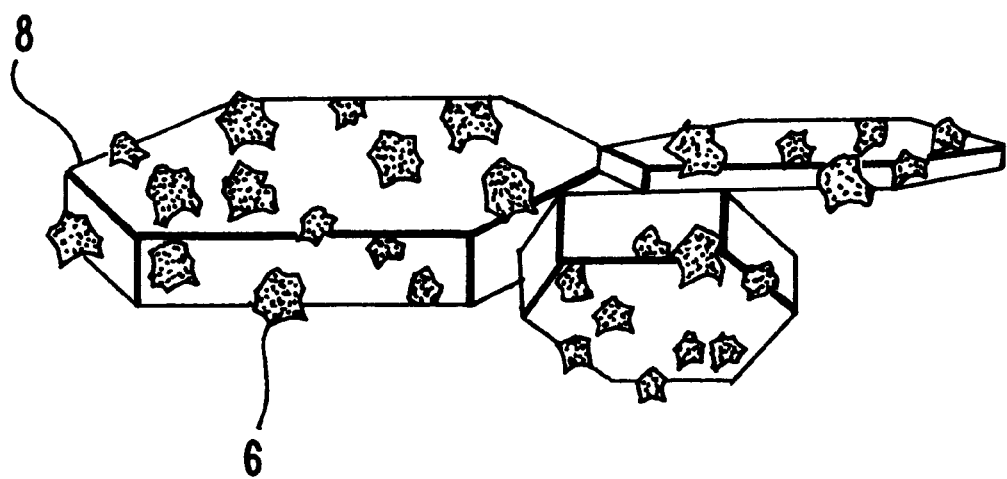
FIG. 1b depicts schematically a metal oxide/aluminum oxide powder made of prereacted $K_2O$ and MgO and $Al_2O_3$ (8) and coated homogeneously with sinter additive (6)
Figure 2:
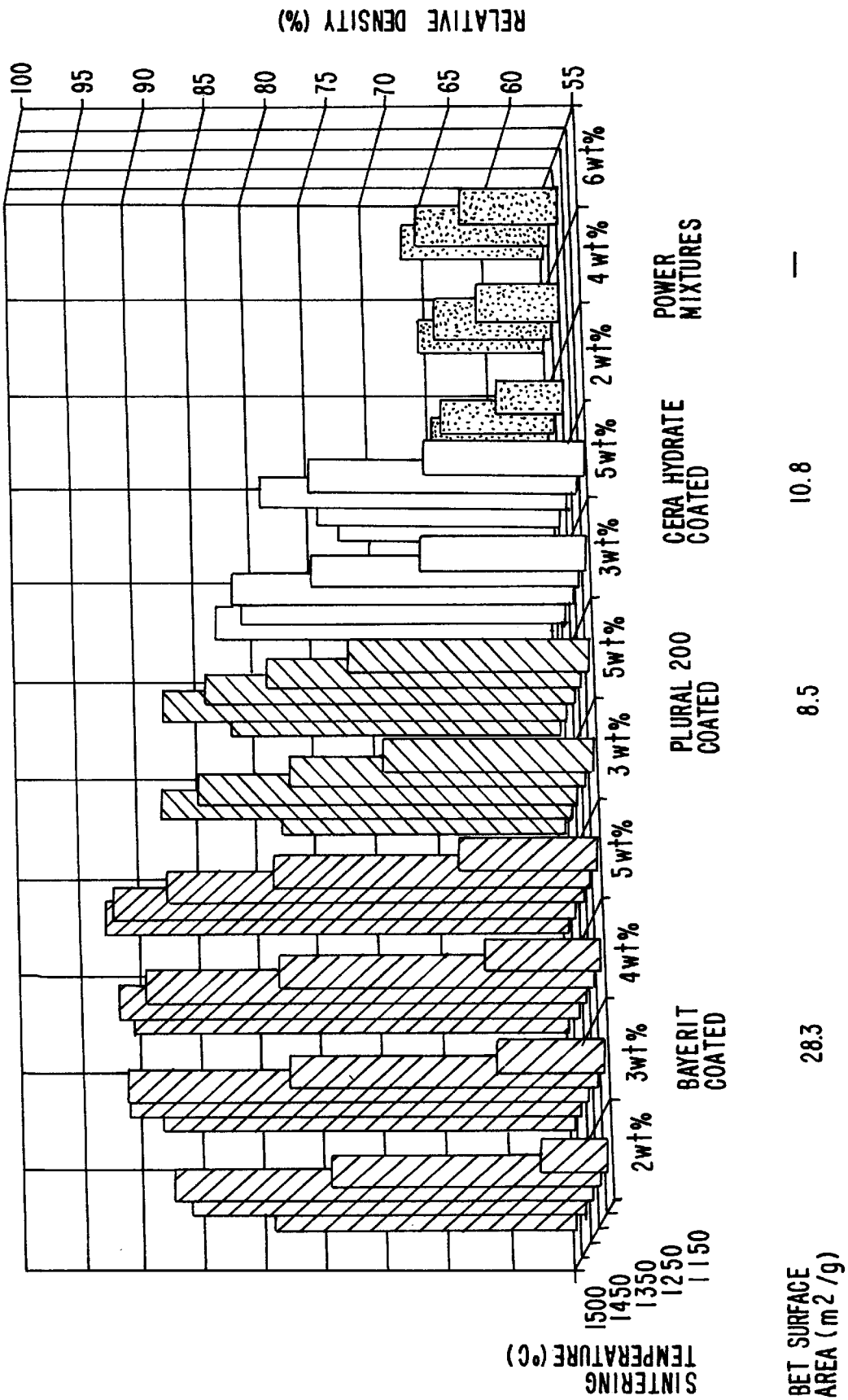
FIG. 2 shows the relative densities of sintered K-β aluminates made from various starting materials and with different proportions of sinter additive.
Figure 3A:
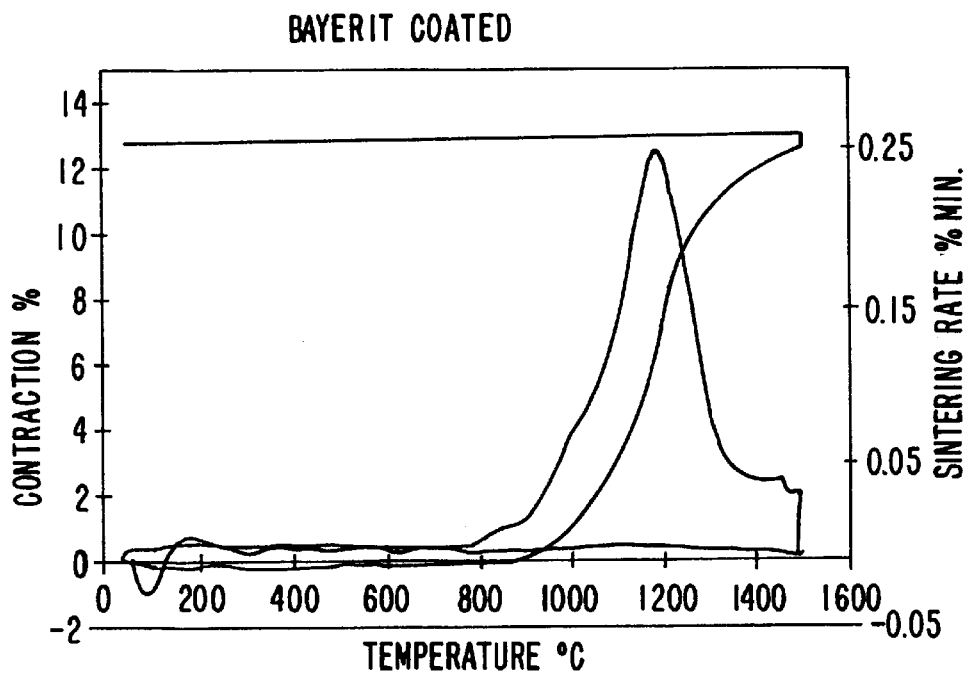
FIG. 3 depicts the course of sintering processes undergone by different starting materials as a function of temperature.
Figure 3B:
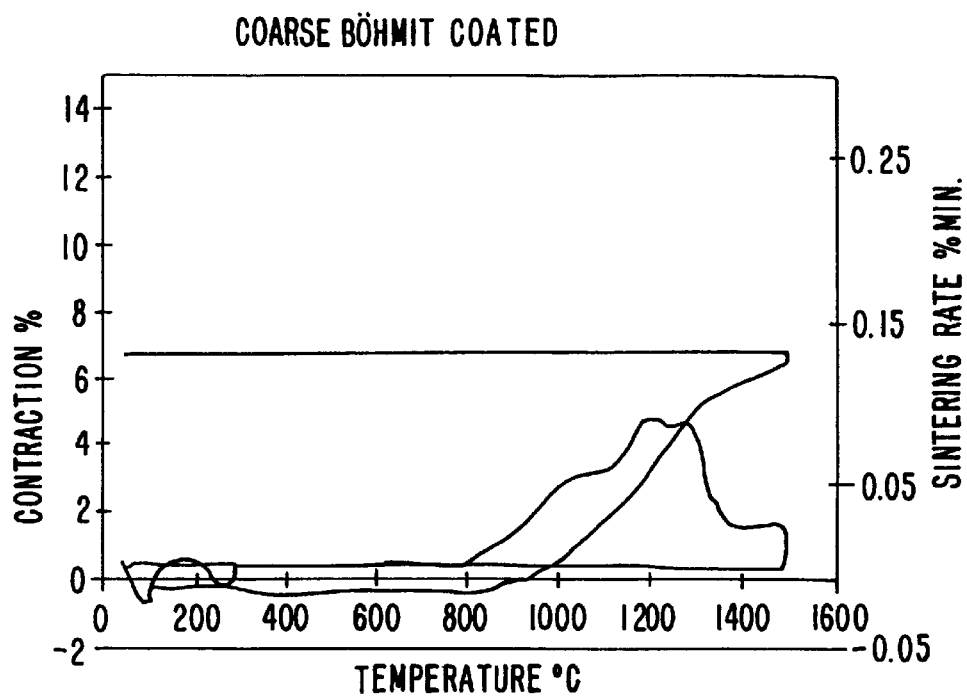
Figure 3C:
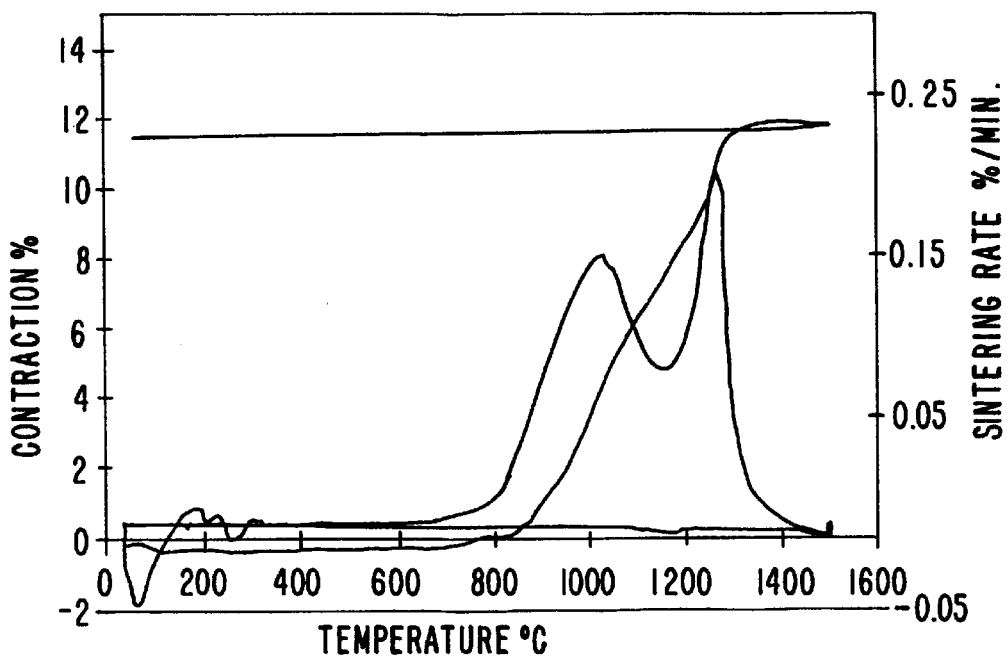
Figure 3D:
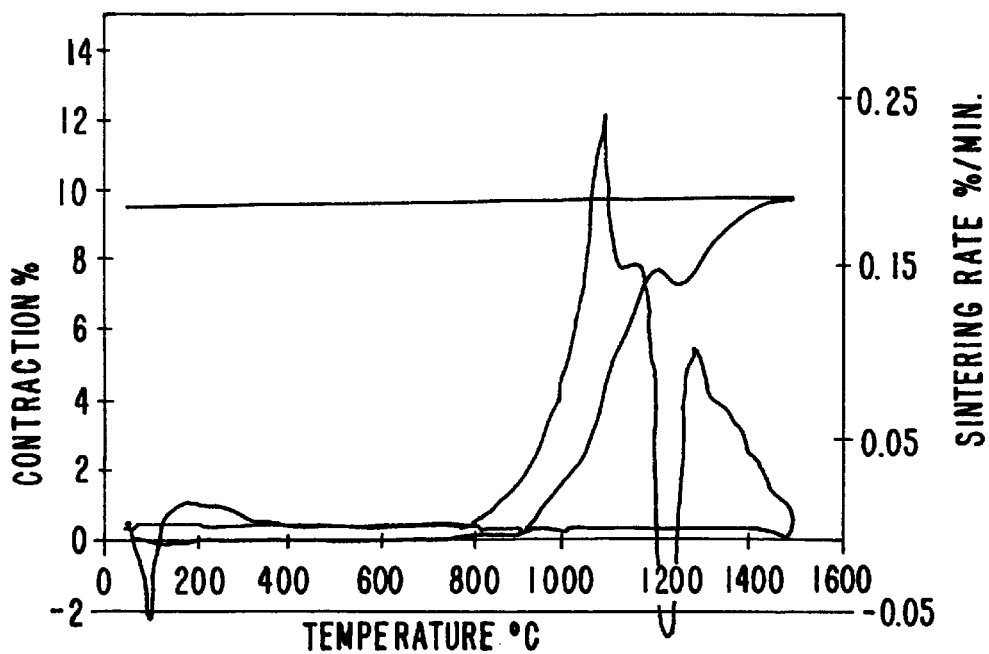

In addition, a mixture of two different aluminum oxide powders and a sinter additive were prepared. The sinter additive accounted for 2–6 wt. % relative to the total dry weight. The mixtures were then sintered at an increasing sintering temperature which ranged from 1150° C. to 1550° C. The relative densities of the resulting ceramic formed pieces are shown in FIG. 2.

Example 2

The course of the sintering processes undergone by the powder mixtures described in Example 1 was examined as a function of temperature. The results are shown in FIG. 3.

Coated bayerite shows a maximum compacting rate at about 1150° C. Compaction ensues in a single and therefore easily controllable step.

When use is made of fine-grained boehmite, the compacting rate fluctuates considerably and the relative density of the ceramic formed pieces is not as high as when use is made of bayerite as starting material. However, fine-grained boehmite does offer the advantage of forming a coarser microstructure, as a result of which increased conductivity can be obtained.

Coarse-grained boehmite also leads to a coarse microstructure, but compacts to a markedly lesser extent. The compacting rate of powder mixtures fluctuates so strongly that mechanical stresses develop in the sintered part.

Example 3

Figure 4A:
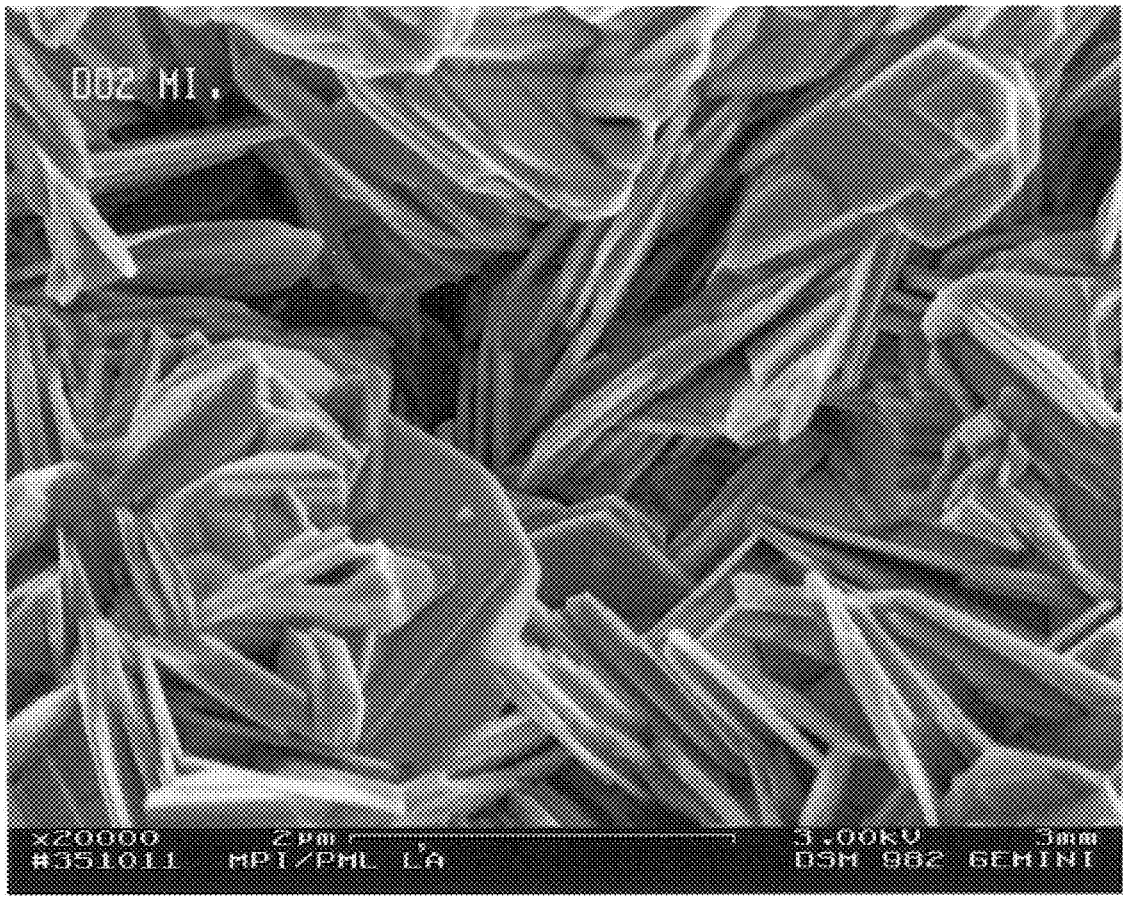
FIG. 4 illustrates by means of fracture-surface images how the sintering atmosphere affects the microstructure of coated Bayerit, with FIG. 4a showing the ceramic surface obtained by sintering in a pure oxygen atmosphere and FIG. 4b showing the ceramic surface obtained by sintering in an oxygen atmosphere under controlled $K_2O$ vapor pressure.

The influence which the alkali metal vapor pressure exerts on the microstructure of K-β-aluminates was investigated. The results are shown in FIG. 4.

Figure 4B:
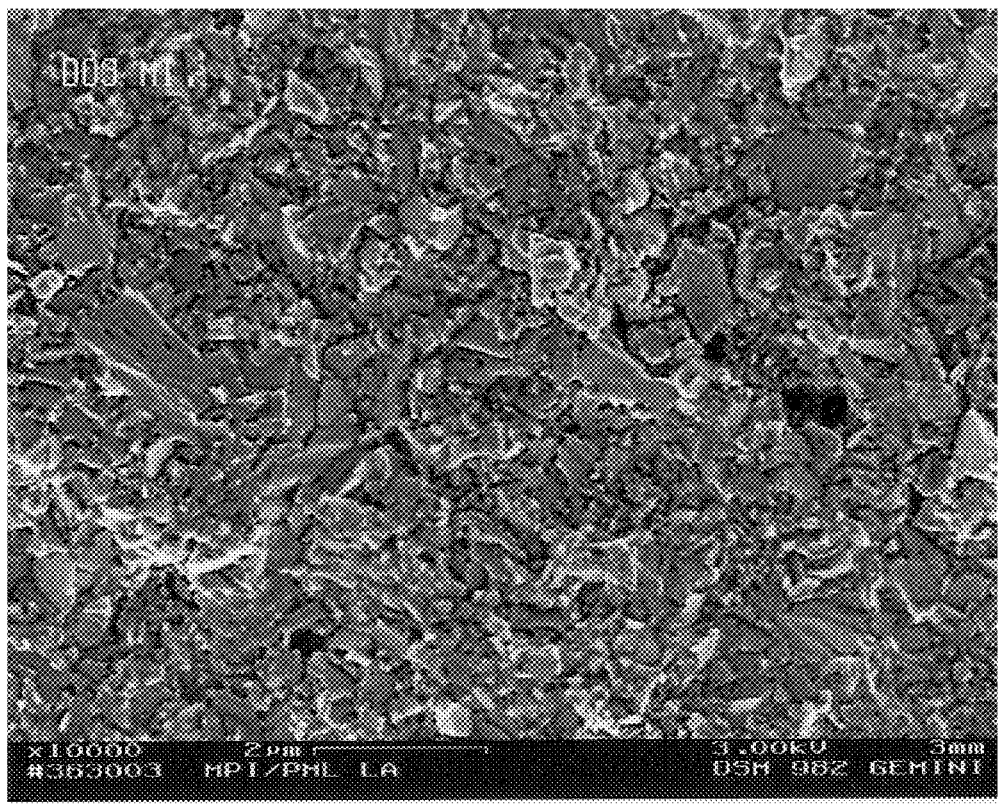

Whereas in an atmosphere of pure, moisture-free oxygen there is very pronounced coarsening of the microstructure (FIG. 4a), use of a sufficiently high external $K_2O$ pressure makes it possible to prevent the decomposition reactions of K-β" phases and resulting coarsening of the microstructure (FIG. 4b).

Example 4

Figure 5:
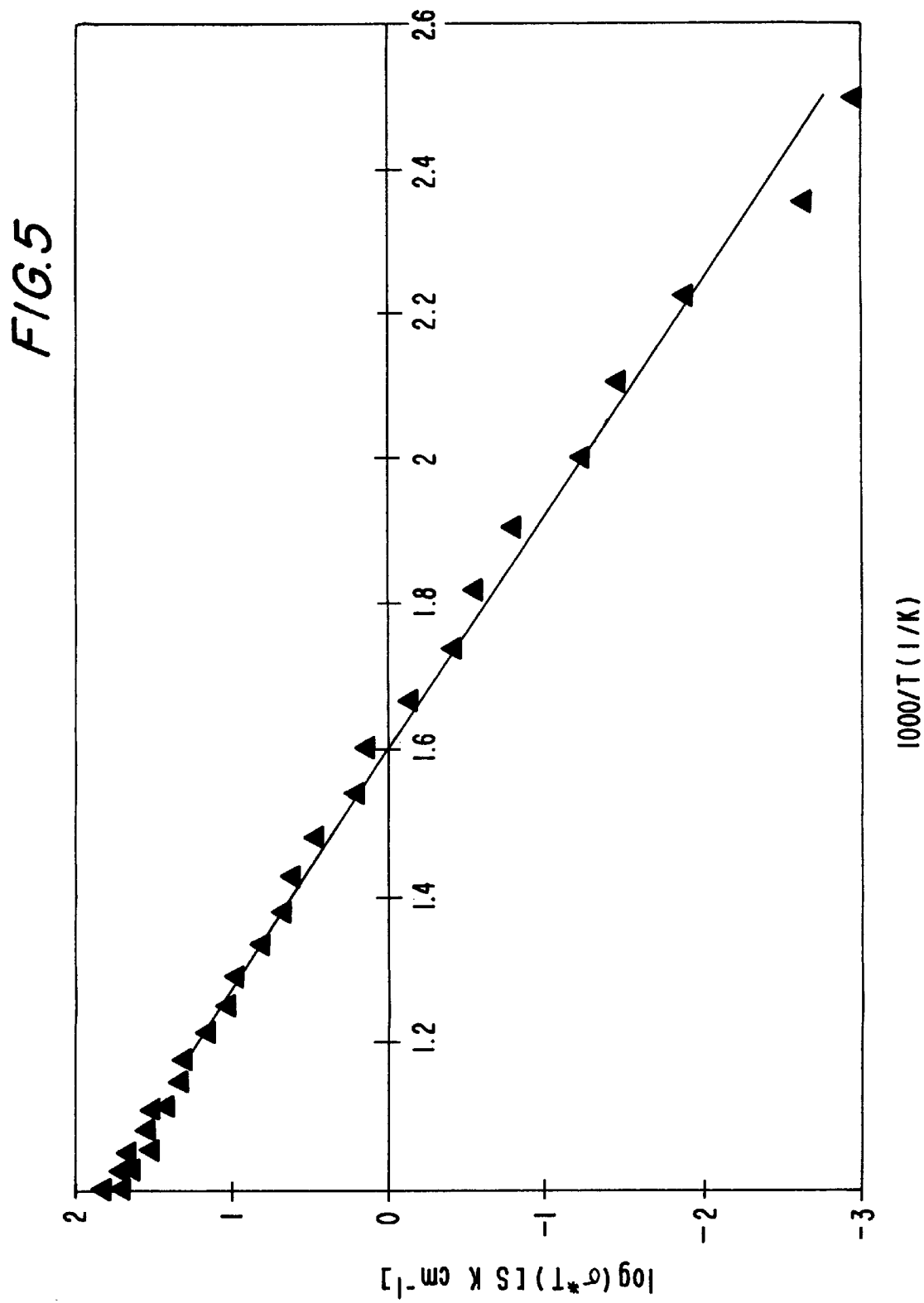
FIG. 5 depicts the ionic conductivity of liquid-phase-sintered K-β/β"-aluminate.

The ionic conductivity of liquid-phase-sintered potassium-β/β"-aluminate was determined. The results are shown in FIG. 5.

It is seen that through use of the process according to the invention, aluminum oxide ceramics of high ionic conductivity were obtained.

What is claimed is:

1. A method of synthesizing an ion-conductive alkali metal β"-aluminate ceramic, comprising adding 0.1 to 12 wt-%, calculated as $B_2O_3$ boron containing sinter additive to a sinter mixture comprising aluminum oxide and alkali metal oxide, and sintering the resultant boron containing sinter mixture at a temperature of from 1000 to 1500° C.

2. The method of claim 1, wherein said boron containing sinter additive comprises a boron oxide.

3. The method of claim 1, wherein said boron containing sinter additive further comprises an alkali metal oxide.

4. The method of claim 1, wherein said boron containing sinter additive further comprises a magnesium, zinc, nickel, manganese, iron, chromium, cobalt or tin oxide.

5. The method of claim 1, wherein said boron containing sinter additive further comprises a potassium, lithium, or sodium oxide.

6. The method of claim 1, wherein said boron containing sinter additive comprises at least one of $KBO_2$, $K_2B_2O_4$, $K_2B_4O_7$, $Mg_2B_2O_5$, $NaBO_2$, $Na_2B_2O_4$, $Na_2B_4O_7$, $MgB_4O_7$, $LiBO_2$, $Li_2B_2O_4$, $Li_2B_4O_7$, or $Mg_3B_2O_6$.

7. The method of claim 6, wherein said boron containing sinter additive comprises $Na_2B_4O_7$.

8. A process for making an ion-conductive alkali metal β"-aluminate oxide article, comprising adding from about 0.1 to about 12 wt-% calculated as $B_2O_3$ boron-containing sinter additive to a sintering mixture comprising powdered aluminum oxide and potassium oxide, sintering the resultant boron containing sintering mixture and forming the potassium β"-aluminate article.

9. The process of claim 8, wherein said aluminum oxide ceramic formed piece is a β"-aluminum oxide ceramic.

10. The method of claim 8, wherein said powdered aluminum oxide is powdered bayerite or powdered boehmite.

11. The process of claim 8, wherein said powdered aluminum oxide is powdered bayerite or powdered boehmite which has been premixed or prereacted with at least one metal oxide.

12. The process of claim 8, wherein said powdered aluminum oxide has an average grain size of less than 1 μm.

13. The process of claim 8, comprising coating the ceramic particles with said sinter additive by dissolving said boron containing sinter additive in a liquid, adding said liquid to said powdered aluminum oxide to form a mixture, and drying said mixture.

14. The process of claim 8, further comprising sintering at an alkali metal oxide vapor pressure of at least 1 Pa.

15. The process of claim 8, further comprising sintering in a moisture free atmosphere.

16. The process of claim 8, further comprising sintering at a temperature of from 1000° C. to 1500° C.

17. The process of claim 15, comprising sintering at a temperature of from 1250° C. to 1400° C.

18. A method for conducting ions comprising preparing an ion-conductive alkali metal β"-aluminate oxide article comprising from 0.1 to 12 weight percent of $B_2O_3$ by adding from about 0.1 to about 12 wt-% calculated as $B_2O_3$ boron-containing sinter additive to a sintering mixture comprising powdered aluminum oxide and potassium oxide, sintering the resultant boron containing sintering mixture to form the potassium β"-aluminate article and conducting ions with said potassium β"-aluminate article.

19. The method of claim 18, wherein said ion is a potassium ion.

20. The method of claim 18, wherein said ion is a sodium ion.

21. An aluminum oxide ceramic formed piece which comprises an amount of boron corresponding to from 0.1 to 12 weight percent $B_2O_3$ relative to the weight of said ceramic piece, said piece comprising a K—Li—B—Al—O phase, a K—Mg—B—Al—O phase or a K—Li—Mg—B—Al—O phase.

22. The aluminum oxide ceramic formed piece of claim 21, wherein said ceramic formed piece is a β" aluminum oxide formed piece.

23. An aluminum oxide ceramic formed piece, comprising an amount of boron corresponding to from 0.1 to 12 weight percent $B_7O_3$ relative to the weight of said ceramic piece, said piece comprising a Na—Li—B—Al—O phase, a Na—Mg—B—Al—O phase or a Na—Li—Mg—B—Al—O phase.

24. The aluminum oxide ceramic formed piece of claim 23, wherein said formed piece is a β" aluminum oxide formed piece.

25. A method for preparing an ion-conductive potassium β"-aluminate oxide article, comprising transforming a sinter mixture comprising powdered aluminum oxide and alkali metal oxide and from 0.1 to 12 wt-%, calculated as $B_2O_3$, boron containing sinter additive to a sintering mixture comprising powdered aluminum oxide and potassium oxide, sintering the resultant boron containing sintering mixture and forming the potassium β"-aluminate article.

26. The method of claim 1, wherein said sinter mixture is a two phase powder mixture wherein the first phase comprises premixed or prereacted potassium oxide and aluminum oxide, and the second phase comprises premixed or prereacted aluminum oxide and a metal oxide other than potassium oxide.

27. The method of claim 1, wherein said sinter mixture is at least one member selected from the group consisting of prereacted potassium oxide and MgO-doped aluminum oxide powder.

* * * * *

UNITED STATES PATENT AND TRADEMARK OFFICE
CERTIFICATE OF CORRECTION

PATENT NO. : 6,110,854
DATED : August 29, 2000
INVENTOR(S) : Aldinger et al.

It is certified that error appears in the above-identified patent and that said Letters Patent is hereby corrected as shown below:

Title page,
U.S. Patent Documents, insert --
    4013477    3/77    Jaktar et al.
    5474959    12/95    Schäfur et al.
    4233078    11/86    Brown --.

Foreign Patent Documents, insert --
    2257554    8/75    France
    9003955    4/90    World
    4122586    6/92    Germany --.

Other Publications, insert --
6053 Journal of Materials Science 19 (1984) March No. 3 London, Great Britain, pp 695-715; Review Structure, Properties and Production of $\beta$-Alumina; by R. Stevens and J.G.P. Binner; Dept. of Ceramics, University of Leeds, Leeds, UK; C04B 35/113
JP 1138170 A 890531 DW8929; Low Temp. Sinterable Alumina Sintered Compact ...; (Aiko N.; Abstract No. 89-201357; C04B 35/10 --.

Change "Enhancmt" to -- Enhancement --.

Signed and Sealed this

Twenty-third Day of October, 2001

Attest:

NICHOLAS P. GODICI
Acting Director of the United States Patent and Trademark Office Attesting Officer